US010402991B2

(12) United States Patent
Carolus et al.

(10) Patent No.: US 10,402,991 B2
(45) Date of Patent: Sep. 3, 2019

(54) DEVICE AND METHOD FOR REGISTRATION OF TWO IMAGES

(71) Applicant: KONINKLIJKE PHILIPS N.V., Eindhoven (NL)

(72) Inventors: Heike Carolus, Hamburg (DE); Sven Kabus, Hamburg (DE); Holger Schmitt, Luetjensee (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 81 days.

(21) Appl. No.: 15/315,198

(22) PCT Filed: May 4, 2015

(86) PCT No.: PCT/EP2015/059711
§ 371 (c)(1),
(2) Date: Nov. 30, 2016

(87) PCT Pub. No.: WO2015/185308
PCT Pub. Date: Dec. 10, 2015

(65) Prior Publication Data
US 2018/0218506 A1 Aug. 2, 2018

(30) Foreign Application Priority Data
Jun. 4, 2014 (EP) .................................... 14171087

(51) Int. Cl.
G06K 9/00 (2006.01)
G06T 7/33 (2017.01)
G06T 7/00 (2017.01)

(52) U.S. Cl.
CPC .............. *G06T 7/33* (2017.01); *G06T 7/0012* (2013.01); *G06T 2207/10072* (2013.01); *G06T 2207/20101* (2013.01); *G06T 2207/30004* (2013.01)

(58) Field of Classification Search
CPC ..................... G06T 7/33; G06T 7/0012; G06T 2207/10072; G06T 2207/20101; G06T 2207/30004
(Continued)

(56) References Cited

U.S. PATENT DOCUMENTS

2003/0063788 A1 4/2003 Boland
2007/0081712 A1 4/2007 Huang
(Continued)

FOREIGN PATENT DOCUMENTS

WO 2013/132402 9/2013

OTHER PUBLICATIONS

Siadat, et al., "Knowledge-based localization of hippocampus in human brain MRI", Computers in Biology and Medicine, vol. 37, No. 9, 2007.
(Continued)

*Primary Examiner* — Andrew M Moyer
(74) *Attorney, Agent, or Firm* — Larry Liberchuk

(57) ABSTRACT

The present invention relates to a device and method for registration of two images. To increase the accuracy of the registration the device comprises an input unit (126) for receiving one or more pairs of negative landmarks, which are indicated in the two images, a pair comprising two negative landmarks, one in each image, which structures are not identical and should not be aligned by the registration. Further, a registration unit (128) is provided for performing a registration of the two images by determining a transformation for transforming at least one of the images for registering it with the other image and determining a spacing measure of the distance between a first landmark in the transformed image and a second landmark in the other image, wherein the transformation is determined such that the spacing measure for a first landmark and a second
(Continued)

landmark of at least one pair of negative landmarks is above a first distance threshold, whereby the negative landmarks are taken into account in the registration but are not aligned by the registration.

15 Claims, 2 Drawing Sheets

(58) Field of Classification Search
USPC .......................................................... 382/294
See application file for complete search history.

(56) References Cited

U.S. PATENT DOCUMENTS

2010/0260392 A1 10/2010 Wiemker
2013/0329980 A1 12/2013 Pekar
2014/0044359 A1 2/2014 Rousson

OTHER PUBLICATIONS

Papenberg, et al., "Landmark Constrained Non-parametric Image Registration with Isotropic Tolerances", 2009.
Jaing, et al., "Learning Based Coarse-to-ne Multi-modality Image Registration", IEEE Conf. CVPR, pp. 1-7, 2008.
Kurkure, et al., "Landmark/Image-based Deformable Registration of Gene Expression Data" Computer Vision and Pattern Recognition (CVPR), 2011 IEEE.
Liu, et al., Chapter 27, Anatomical Landmark Detection, pp. 717-754, 2013.
Murphy, et al., "Evaluation of Methods for Pulmonary Image Registration: The EMPIRE10 Study", IEEE Trans Med Imaging. Nov. 2011;30(11):1901-20.

FIG.1A  FIG.1B
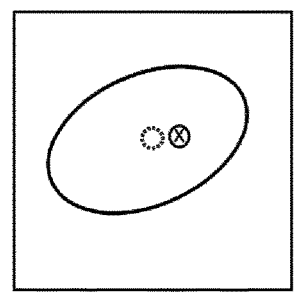 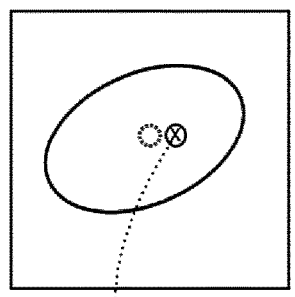 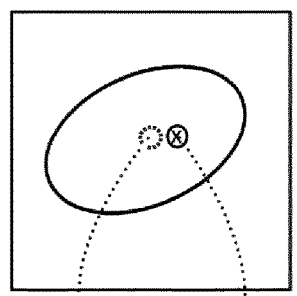
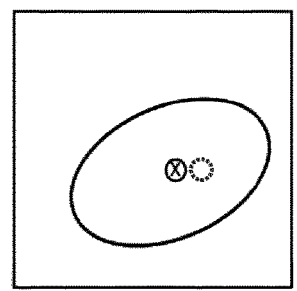 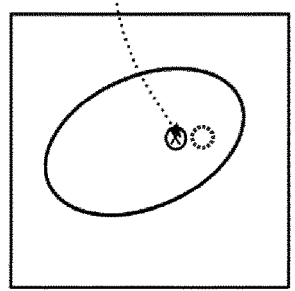 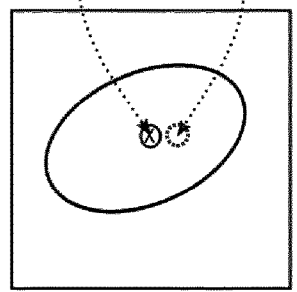
FIG.3A  FIG.3B  FIG.3C

US 10,402,991 B2

DEVICE AND METHOD FOR REGISTRATION OF TWO IMAGES

CROSS REFERENCE TO RELATED APPLICATIONS

This application is the U.S. National Phase application under 35 U.S.C. § 371 of International Application No. PCT/EP2015/059711, filed May 4, 2015, published as WO 2015/185308 on Dec. 10, 2015, which claims the benefit of European Patent Application Number 14171087.1 filed Jun. 4, 2014. These applications are hereby incorporated by reference herein.

FIELD OF THE INVENTION

The present invention relates to a device and method for registration of two images.

BACKGROUND OF THE INVENTION

Medical imaging modalities such as computed tomography (CT), magnetic resonance (MR), ultrasound (US), single photon emission computed tomography (SPECT), positron emission tomography (PET), and x-ray can play an important role in the diagnosis of diseases such as cancer. For instance, they can be used to non-invasively obtain information indicative of physiological tissue in the body, and such information can be used to facilitate determining whether a tumor is benign or malignant. Such non-invasive techniques typically are less risky and costly than an invasive technique such as a biopsy. In addition, for relatively small tumors, such as tumors 10 millimeters or less, it may be relatively difficult to ascertain whether a biopsy needle hit the tumor.

More particularly, images such as CT images can be used to perform a differential diagnosis. By way of example, two CT images, both including information indicative of the same tumor, but generated from data acquired at a different moment in time, for example one to six months apart, can be used to access tumor growth over time by comparing the size of the tumor in the first image with the size of the same tumor in the second image. Generally, an increase in tumor size greater than a pre-set threshold (e.g., 20%) indicates that the tumor is malignant, whereas non-growth or growth less than the threshold indicates that the tumor is benign.

Unfortunately, when comparing such images some organs such as the lung may not be in the same position in both images due to differences in patient setup. As a consequence, spatial registration between the images may be problematic. For example, the clinician may have to manually review a number of images (e.g., 200 or more) in a second set of images, generated with data acquired in a second scan, in order to find an image that shows the tumor for comparison with a first image from a first scan. Even after spatial registration, structures inside the lungs such as the tumor may not be in the same location due to differences in the respiratory state.

Registration algorithms are widely used as base technology to facilitate side-by-side image comparison, e.g., in tumor follow-up or for comparison of multi-modal images. The aim of many registration algorithms is to minimize a given similarity term, e.g., a difference of image gray-values, constrained by a regularization model, which allows only for reasonable transformations (also called deformations).

Usually, a registration algorithm runs without any user input. However, for challenging tasks, e.g., CT and 3D ultrasound, landmarks, which are generally set by the user, can be employed to facilitate the registration. Landmark-based registration can further be applied to locally recover failed registration results. In this case supplementary information in form of landmarks is provided and employed during a second-pass registration as additional constraints. Such registration algorithms are e.g. known from US 2013/0329980 A1 or US 2010/0260392 A1.

SUMMARY OF THE INVENTION

It is an object of the present invention to provide a device and method for registration of two images with increased accuracy.

In a first aspect of the present invention a device for registration of two images is presented comprising an input unit for receiving one or more pairs of negative landmarks, which are indicated in the two images, a pair comprising two negative landmarks, one in each image, which structures are not identical and should not be aligned by the registration, and a registration unit for performing a registration of the two images by determining a transformation for transforming at least one of the images for registering it with the other image and determining a spacing measure of the distance between a first landmark in the transformed image and a second landmark in the other image, wherein the transformation is determined such that the spacing measure for a first landmark and a second landmark of at least one pair of negative landmarks is above a first distance threshold, whereby the negative landmarks are taken into account in the registration but are not aligned by the registration.

In a further aspect of the present invention a corresponding method for registration of two images is presented In yet further aspects of the present invention, there are provided a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, computer program and medium have similar and/or identical preferred embodiments as the claimed system and as defined in the dependent claims.

The present invention is based on the idea to make use of negative landmarks (also called repelling landmarks) in the registration, which shall not be aligned, in contrast to conventionally used (positive) landmarks which shall be aligned in a registration. Hence, according to the present invention points or groups of points, in general structures, are marked, which the registration is not allowed to match such that resembling but non-corresponding structures are repelled from each other. This provides for an improved ability to perform an accurate registration even in challenging situations in which the conventional registration algorithms may fail or have a lower accuracy.

In this context it shall be noted that the proposed registration of two images includes the registration of two volumes, i.e. 3D data sets, and is not limited to the registration of 2D data sets, e.g. of slice images or projection images.

The registration unit is configured to determine a transformation for transforming at least one of the images for registering it with the other image and to determine a spacing measure of the distance between a first landmark in the transformed image and a second landmark in the other image, wherein the transformation is determined such that the spacing measure for a first landmark and a second landmark of at least one pair of negative landmarks is above a first distance threshold. The negative landmarks can be combined with any conventional registration algorithm which is further constrained in this case to make sure that the negative landmarks will not get aligned in the registration. In other words, the distance between the two landmarks shall be larger than the first distance threshold. Said threshold may be predetermined and set once, e.g. as obtained from simulation or calibration measurements. As distance, the absolute or Euclidean distance between two negative landmarks is preferably evaluated.

Preferably, the registration unit is configured to determine the transformation such that the spacing measure for a first landmark and a second landmark of all pairs of negative landmarks is above said first distance threshold. This further increases the accuracy of the registration.

In another embodiment the input unit is configured to receive one or more pairs of positive landmarks, which are indicated in the two images, a pair comprising two positive landmarks, one in each image, that are assigned to structures in the two images which are identical, and wherein the registration unit is configured to determine the transformation such that the spacing measure for a first landmark and a second landmark of a pair of positive landmarks is below a second distance threshold. Hence, positive and negative landmarks are used, which may further increase the accuracy. In a further embodiment, this second threshold could also be zero if an exact correspondence is requested.

In still a further embodiment a landmark detection unit is provided for detecting one or more pairs of negative landmarks and for providing the detected one or more pairs of negative landmarks to the input unit. Hence, in this embodiment an automatic detection of the negative landmarks is made, e.g. based on a recognition and classification of various landmarks in the two images.

Preferably, said landmark detection unit is configured to detect one or more pairs of positive landmarks and for providing the detected one or more pairs of positive landmarks to the input unit. Hence, also the positive landmarks may be obtained automatically.

Alternatively, the proposed device further comprises a user interface for enabling a user to set one or more pairs of negative landmarks and for providing the detected one or more pairs of negative landmarks to the input unit. Said user interface is preferably configured to enable a user to set one or more pairs of positive landmarks and for providing the detected one or more pairs of positive landmarks to the input unit. Hence, a user may select and set negative and/or positive landmarks manually for use in the registration.

Further, a user interface may be provided for enabling a user to set said first distance threshold and/or said second distance threshold. In this way the obtainable accuracy can be influenced and optimized.

Preferably, said registration unit is configured to use identical first and second distance thresholds, i.e. in fact only a single threshold is used for use with positive and negative landmarks.

In an embodiment said registration unit is configured to use individual first distance thresholds and/or individual second distance thresholds for different transformation directions. In this context a transformation direction shall be understood as a direction along which the image or pixels/voxels of the image shall be transformed according to the registration, i.e. a transformation can be the x-,y- or z-component or one of the axes of an image. In this way a further increase in accuracy may be obtained.

Still further, said registration unit is preferably configured to use additional prior knowledge and/or conditions for performing the registration of the two images, in particular to use the condition that negative landmarks are not allowed to slide along edges or contours. For instance, if the registration of the chest results in a mismatch of ribs. Negative landmarks can now be set on the tip of two non-corresponding ribs which were falsely matched. For the conventional registration it would now be more tempting to just retreat one of the ribs until the required distance of the two landmarks is achieved instead of really separating the two ribs. This, however, can be avoided according to this embodiment if as an additional condition it is prevented that negative landmarks may slide along edges (e.g. in this example along a rib). As a result, the two landmarks are not only at the required distance (as given by the condition regarding the distance between the negative landmarks), but also the two edges or contours (i.e. the falsely matched ribs in this example) are spaced apart after the registration as carried out according to this embodiment.

According to another aspect an imaging device is presented according to the present invention comprising
an image acquisition unit for acquiring images of a subject, and
a device as disclosed herein for registration of at least one image acquired by said image acquisition unit with another image acquired by the image acquisition unit or by another imaging device.

Said imaging device may e.g. be an x-ray device, a CT apparatus, an MR apparatus, an ultrasound apparatus, etc. having an appropriate image acquisition unit.

BRIEF DESCRIPTION OF THE DRAWINGS

These and other aspects of the invention will be apparent from and elucidated with reference to the embodiment(s) described hereinafter. In the following drawings
FIG. 1 shows two exemplary scan images of the liver illustrating the problem addressed by the present invention,
FIG. 2 shows a schematic diagram of an imaging device according to the present invention and
FIG. 3 shows schematic images illustrating the problem and the solution addressed by the present invention.

DETAILED DESCRIPTION OF THE INVENTION

Figure 2:
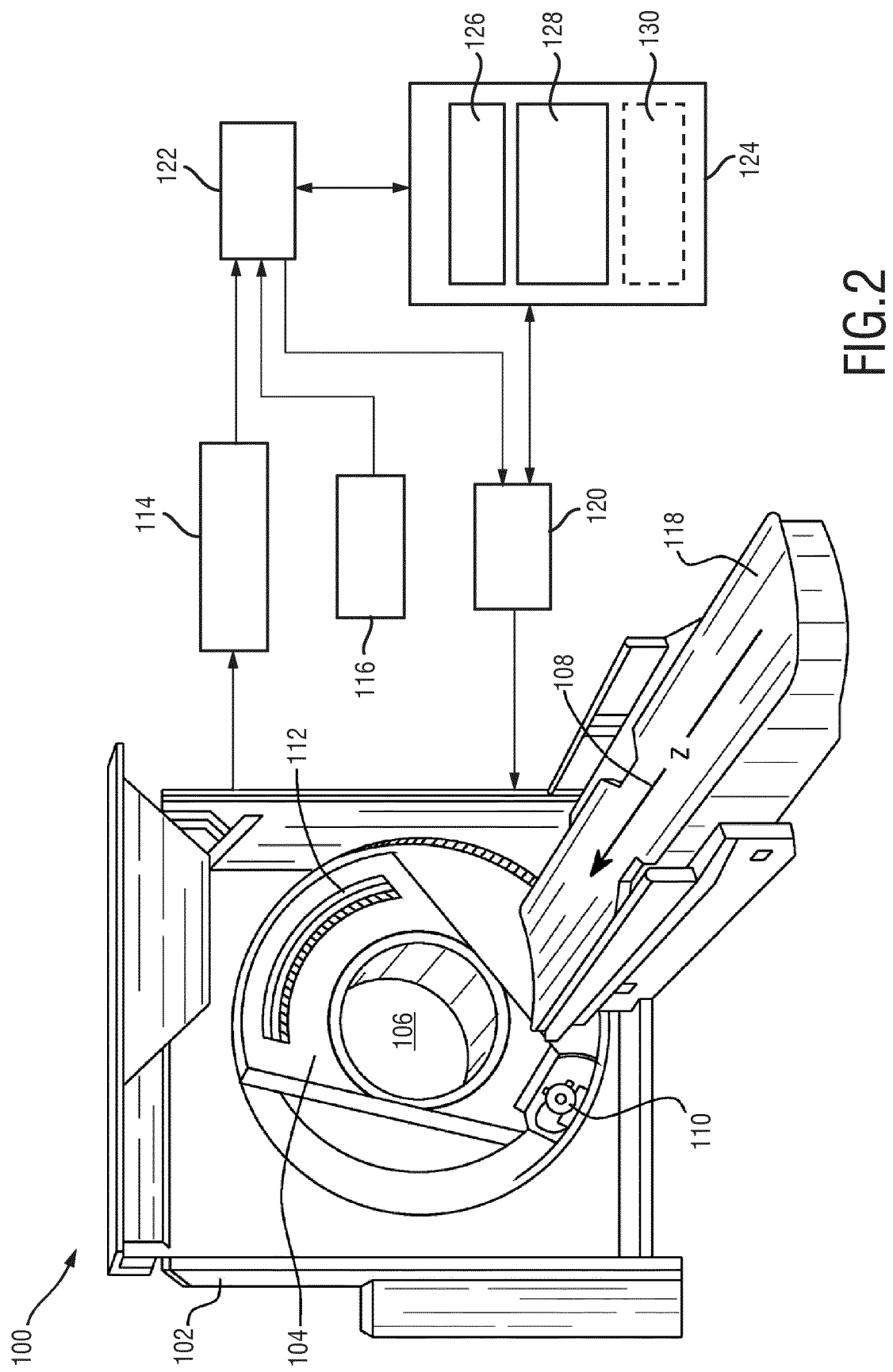

Generally, the task of registration algorithms is to identify image correspondences. This can e.g. be employed by minimizing a similarity measure under certain conditions. Yet, sometimes objects may appear similar, although they do not correspond. FIG. 1 shows two exemplary contrast-enhanced multi-phase scan images, in particular coronal views of the liver of the same patient in the arterial phase (FIG. 1A) and in the venous phase (FIG. 1B). In both images vessels (indicated by arrows) are visible; yet, the vessel shown in FIG. 1A belongs to the arterial system and the vessel shown in FIG. 1B belongs to the venous system.

Clearly, these vessels shall not be matched in a registration, but could be matched by an automatic registration algorithm.

To give another example, in thorax CT the problem is often that correspondences of the ribs are not established correctly. Due to respiratory motion the thorax expands and the position of the ribs relative to the diaphragm changes. Since the diaphragm is a very distinct and large structure, it has a much stronger influence than the ribs if a volume-based registration approach is used. Hence, a mismatch of ribs, e.g., registering rib 12 in one image with rib 11 in the other image, which looks very much alike, might accidentally happen.

In the first example illustrated in FIG. 1, the identification of reasonable landmarks, which improve the registration, would be cumbersome, if not even impossible. Here the usage of negative (or repelling) landmarks, marking, e.g., two falsely matched bifurcations as proposed according to the present invention, is more promising.

In case of the second example related to thorax CT, the standard usage of landmarks stating the correct rib correspondence would most likely improve the registration result. Yet, the usage of negative landmarks is also conceivable under given constraints. For a good result the image content should additionally be considered, i.e. a shift of the negative landmarks along the rib should not be allowed.

FIG. 2 shows an embodiment of an imaging device in the form of a computed tomography (CT) system 100. The CT system 100 includes a stationary gantry 102, which is stationary in the sense that it is generally stationary during scanning. However, the stationary gantry 102 may be configured to tilt and/or otherwise be moved. The CT system 100 also includes a rotating gantry 104, which is rotatably coupled to the stationary gantry 102. The rotating gantry 104 rotates around an examination region 106 about a longitudinal or z-axis 108. A radiation source 110, such as an x-ray tube, is supported by and rotates with the rotating gantry 104 around the examination region 106. The radiation source 110 emits generally fan, wedge, or cone shaped radiation that traverses the examination region 106.

A radiation sensitive detector array 112 detects photons emitted by the radiation source 110 that traverse the examination region 106 and generates projection data indicative of the detected radiation. The illustrated radiation sensitive detector array 112 includes multiple rows of radiation sensitive photo sensor that extend in the z-axis direction, and multiple columns of radiation sensitive photo sensors that extend in a traverse direction. A single row detector array configuration is also contemplated.

A reconstructor 114 reconstructs the projection data from the detectors to generate volumetric image data indicative of the interior anatomy of the patient.

An image processor 116 processes the volumetric image data generated by the reconstructor 114 for display in human readable form.

A patient support 118, such as a couch, supports a patient in the examination region 106. The patient support 118 is movable along the z-axis 108 in coordination with the rotation of the rotating gantry 104 to facilitate helical, axial, or other desired scanning trajectories.

A general purpose computing system 120 serves as an operator console. The operator console 120 includes human readable output devices such as a display and/or printer and input devices such as a keyboard and/or mouse. Software resident on the console 120 allows the operator to control the operation of the system 100, for example, by allowing the operator to select a scan protocol, initiate and terminate scanning, view and/or manipulate the volumetric image data, and/or otherwise interact with the system 100.

A storage component 122 can be used to store the volumetric image data generated by the reconstructor 114 and/or the one or more images generated by the image processor 116.

A registration device 124 is used to register data acquired at different moments in time and/or with different imaging devices. For instance, an image acquired by the CT system 100 may be registered with an image acquired earlier by the same CT system or by a different imaging system, such as an ultrasound system or an X-ray device. As described in greater detail below, the registration device 124 comprises an input unit 126 for receiving one or more pairs of negative landmarks, which are indicated in the two images, a pair comprising two negative landmarks, one in each image, that are assigned to structures in the two images which are not identical and should not be aligned by the registration. Further, the registration device 124 comprises a registration unit 128 for performing a registration of the two images, wherein the negative landmarks are taken into account in the registration and are not aligned by the registration.

Conventionally, landmarks (called "positive landmarks" herein) are employed to mark points which the registration algorithm is supposed to match. According to the present invention, however, negative (or repelling) landmarks are employed to annotate structures, which should not be aligned. This is schematically illustrated in FIG. 3. FIG. 3A depicts two original images that shall be registered showing a venous scan (upper images) and an arterial scan (lower images) of an organ, e.g. the liver. Landmarks placed inside the vessels are marked with a cross. FIG. 3B depicts the registration result of a conventional registration algorithm matching the two landmarks, resulting in a mismatch of the arterial and venous vessels. FIG. 3C depicts the registration result obtained by used of the proposed registration employing with negative landmarks resulting in a correct match of the vessels. To this end, the initial registration can be done more precisely and/or a failed registration can be locally refined so that it is avoided that similar structures, which do not correspond, are matched.

Algorithms, which aim to match landmarks with a given tolerance, are generally known, e.g. from Papenberg et al., Landmark Constrained Non-parametric Image Registration with Isotropic Tolerances, B V M, 2009. Given a landmark r in a reference image, a landmark t in a template image that shall be registered with the reference image, a deformation u obtained by the registration algorithm, and a tolerance c defining the allowed distance of the two landmarks, the constraint for landmark-based registration is generally given by:

$$\|u(r)-t\| \leq c.$$

According to the present invention, the two negative landmarks shall not be aligned, which can easily be obtained in an embodiment of the present invention by demanding a mismatch as follows:

$$\|u(r)-t\| \geq c.$$

In other words, a transformation for transforming at least one of the images for registering it with the other image and a spacing measure of the distance between a first landmark in the transformed image and a second landmark in the other image are determined. This transformation is determined such that the spacing measure for a first landmark and a second landmark of at least one pair of negative landmarks is above a first distance threshold represented by c in equation (2). This constraint can be integrated into many registration algorithms, i.e., rigid, affine, or non-parametric registration algorithms.

In an embodiment an anisotropic tolerance is used, i.e., a larger distance of the landmarks is requested in one dimension than in another direction. Still further, in an embodiment image content may be used, e.g., the sliding of negative landmarks along edges, is provided.

According to one embodiment, the registration device 124 is integrated into a GUI (graphical user interface) or comprises a user interface, which may be the operator console 120 or an individual user interface integrated into the registration device. Thus, the user can set negative landmarks at points (or, more generally, structures), which do not correspond from his point of view and are already falsely matched by the registration algorithm or which should not be matched in a registration. Then, either in a first-pass or second-pass registration these points will not be aligned, resulting in an improved registration outcome.

In another embodiment, the registration unit 128 is configured to automatically determine certain negative landmarks or objects, e.g., for a segmentation of the vessel tree to identify regions or points automatically which should not be matched. For this purpose a landmark detection unit 130 may optionally be provided as shown in FIG. 2. This approach would omit the need of user interaction.

Automatic landmark detection may e.g. use anatomical knowledge for a specific application. This could be, e.g., obtained from a segmentation. For instance, using again the liver in the arterial and venous phase, the negative landmarks could be set on large bifurcations of two different vessel trees which may be identified automatically in a corresponding image data set. Various methods exist which can detect landmarks automatically like interest point detectors or algorithms based on vesselness or distinctiveness.

Hence, different ways of detecting negative landmarks are possible, including automatic, semi-automatic and manual methods. For instance, the user may manually select landmarks in two images which definitely indicate different anatomical structures, such as different bifurcations of vessels. In the same way, however, an automatic algorithm can be designed to select such different anatomical structures or to find out in a pre-processing step if certain landmarks found in two images indicate the same anatomical structure or different anatomical structures and, accordingly, to mark them as positive landmarks (if they indicate the same anatomical structure) or negative landmarks (if they indicate different anatomical structures).

Various embodiments exist for performing the registration. In some embodiments an intensity-based registration may be used comparing intensity patterns in images via correlation metrics, in addition to which the negative landmarks are used to avoid inaccuracies of the intensity-based registration. In still further embodiments not only negative landmarks are used, but in addition positive landmarks may be used as well in the same registration step or in separate registration steps. The positive landmarks may also be set by the user or determined automatically, as explained above for the negative landmarks. Further, the condition as expressed above in equation (1) can be used, which in other words means that the transformation for transforming at least one image is determined such that the spacing measure for a first landmark and a second landmark of a pair of positive landmarks is below a second distance threshold represented by c in equation (1).

In this example the first distance threshold and the second distance threshold are identical, but generally separate threshold may be used. These thresholds may be predetermined, e.g. in simulations or calibration measurements, but may also be set and/or varied by the user.

Further, not only a single pair of negative (and, optionally) positive landmarks may be used, but generally two or more pairs may be used. Still further, in another option one negative landmark is selected in a first image and two or more negative landmarks may be selected in the other image which shall not be matched with the one selected negative landmark in the first image. Hence, several pairs are used, whereby a negative landmark (of the first image) is used two or more times in different pairs. Additionally or alternatively, in the other way around, it may be foreseen that two or more negative landmarks in the first image may not be matched with one negative landmark in the second image. Still further, it may be foreseen that all (or many) negative landmarks in the first image are not matched to all (or many) negative landmarks in the second image.

In summary, the present invention proposed the use of negative landmarks by marking points which the registration is not allowed to match such that resembling but non-corresponding structures are repelled from each other. In many situations this can increase the accuracy of the registration.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for registration of two images comprising:
an input unit for receiving one or more pairs of negative landmarks, which are indicated in the two images, a pair comprising two negative landmarks, one in each image, that are assigned to structures in the two images, which structures are not identical and should not be aligned by the registration, and
a registration unit for performing a registration of the two images by determining a transformation for transforming at least one of the images for registering it with the other image and determining a spacing measure of the distance between a first landmark in the transformed image and a second landmark in the other image, wherein the transformation is determined such that the spacing measure for a first landmark and a second landmark of at least one pair of negative landmarks is above a first distance threshold, whereby the negative landmarks are taken into account in the registration but are not aligned by the registration.

2. The device as claimed in claim 1,
wherein the registration unit is configured to determine the transformation such that the spacing measure for a first landmark and a second landmark of all pairs of negative landmarks is above said first distance threshold.

3. The device as claimed in claim 1,
wherein the input unit is configured to receive one or more pairs of positive landmarks, which are indicated in the two images, a pair comprising two positive landmarks, one in each image, that are assigned to structures in the two images which are identical, and
wherein the registration unit is configured to determine the transformation such that the spacing measure for a first landmark and a second landmark of a pair of positive landmarks is below a second distance threshold.

4. The device as claimed in claim 1,
further comprising a landmark detection unit for detecting one or more pairs of negative landmarks and for providing the detected one or more pairs of negative landmarks to the input unit.

5. The device as claimed in claim 3,
wherein said landmark detection unit is configured to detect one or more pairs of positive landmarks and for providing the detected one or more pairs of positive landmarks to the input unit.

6. The device as claimed in claim 1,
further comprising a user interface for enabling a user to set one or more pairs of negative landmarks and for providing the detected one or more pairs of negative landmarks to the input unit).

7. The device as claimed in claim 3,
wherein said user interface is configured to enable a user to set one or more pairs of positive landmarks and for providing the detected one or more pairs of positive landmarks to the input unit.

8. The device as claimed in claim 1,
further comprising a user interface for enabling a user to set said first distance threshold.

9. The device as claimed in claim 1,
wherein said registration unit is configured to use identical first and second distance thresholds.

10. The Device as claimed in claim 1,
wherein said registration unit is configured to use individual first distance thresholds and/or individual second distance thresholds for different transformation directions.

11. The device as claimed in claim 1,
wherein said registration unit is configured to use additional prior knowledge and/or conditions for performing the registration of the two images.

12. The device as claimed in claim 1,
wherein said registration unit is configured to use the condition that negative landmarks are not allowed to slide along edges or contours.

13. A method for registration of two images comprising:
receiving one or more pairs of negative landmarks, which are indicated in the two images, a pair comprising two negative landmarks, one in each image, which structures are not identical and should not be aligned by the registration, and
performing a registration of the two images by determining a transformation for transforming at least one of the images for registering it with the other image and determining a spacing measure of the distance between a first landmark in the transformed image and a second landmark in the other image, wherein the transformation is determined such that the spacing measure for a first landmark and a second landmark of at least one pair of negative landmarks is above a first distance threshold, whereby the negative landmarks are taken into account in the registration but are not aligned by the registration.

14. A non-transitory computer-readable recording medium comprising a computer program comprising program code means for causing a computer to carry out the steps of the method as claimed in claim 13 when said computer program is carried out on the computer.

15. An imaging device comprising:
an image acquisition unit for acquiring images of a subject, and
a device as claimed in claim 1 for registration of at least one image acquired by said image acquisition unit with another image acquired by the image acquisition unit or by another imaging device.

* * * * *